United States Patent
Lee et al.

(10) Patent No.: US 7,132,489 B2
(45) Date of Patent: Nov. 7, 2006

(54) FLUORINE-CONTAINING AMPHOTERIC POLYMER FOR SURFACE COATING AND PREPARATION METHOD THEREOF

(75) Inventors: Soo-Bok Lee, Daejeon (KR); In Jun Park, Daejeon (KR); Dong-Kwon Kim, Daejeon (KR); Jeong-Hoon Kim, Daejeon (KR); Jong-Wook Ha, Daejeon (KR); Won-Wook So, Daejeon (KR); Kwang-Won Lee, Daejeon (KR); Kwang-Han Kim, Daejeon (KR); Mi-Sun Cha, Daegu (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 0 days.

(21) Appl. No.: 10/835,633

(22) Filed: Apr. 30, 2004

(65) Prior Publication Data

US 2005/0096444 A1    May 5, 2005

(30) Foreign Application Priority Data

Oct. 29, 2003    (KR) ...................... 10-2003-0075898

(51) Int. Cl.
*C08F 14/18*    (2006.01)
(52) U.S. Cl. ...................... 526/253; 526/243; 526/245; 526/249; 526/255; 526/292.2; 526/312; 526/328.5

(58) Field of Classification Search ................ 526/243, 526/245, 249, 253, 255, 292.2, 312, 328.5
See application file for complete search history.

(56) References Cited

U.S. PATENT DOCUMENTS

| | | | | |
|---|---|---|---|---|
| 4,622,288 | A * | 11/1986 | Yokoyama et al. | 430/527 |
| 6,589,665 | B1 * | 7/2003 | Chabrecek et al. | 428/520 |
| 6,790,898 | B1 * | 9/2004 | Lee et al. | 524/458 |
| 6,852,353 | B1 * | 2/2005 | Qiu et al. | 427/2.24 |

* cited by examiner

*Primary Examiner*—Helen L. Pezzuto
(74) *Attorney, Agent, or Firm*—Frommer Lawrence & Haug LLP; Ronald R. Santucci

(57) ABSTRACT

The present invention relates to a fluorine-containing amphoteric polymer for surface coating and preparation method thereof, in particular, to a fluorine-containing amphoteric polymer for surface coating and preparation method thereof in which a hydrocarbon compound with hydrophilic groups serves as a main chain and a macromonomer prepared by copolymerization of an unsaturated hydrocarbon compound and a perfluoro alkyl compound is incorporated into side chains, thereby imparting amphoteric property on the present polymer. Therefore, the present polymer allows self-emulsification and shows soil release, water-repellent and oil-repellent properties with no help of emulsifier, applicable to a variety of industrial fields such as coating, adhesive, fiber, precision chemistry, biological/biochemical industry, electric/electronic, automobile and metal industries.

5 Claims, 1 Drawing Sheet

FLUORINE-CONTAINING AMPHOTERIC POLYMER FOR SURFACE COATING AND PREPARATION METHOD THEREOF

This application claims priority benefits of Korean Patent Application No. 2003-75898 filed Oct. 29, 2003.

BACKGROUND OF THE INVENTION

1. Field of the Invention

The present invention relates to a fluorine-containing amphoteric polymer for surface coating and a preparation method thereof, in particular, to a fluorine-containing amphoteric polymer for surface coating and a preparation method thereof in which a hydrocarbon compound with hydrophilic groups serves as a main chain and a macromonomer prepared by copolymerization of an unsaturated hydrocarbon compound and a perfluoro alkyl compound is incorporated into side chains, thereby imparting amphoteric property on the present polymer. Therefore, the present polymer allows self-emulsification and shows soil release, water-repellent and oil-repellent properties without surfactant, applicable to a variety of industrial fields such as coating, adhesive, fiber, fine chemistry, biological/biochemical industry, electric/electronic, automobile and metal industries.

2. Description of the Related Art

Surface coating agents are widely used for their uses in various industrial fields such as coating, adhesive, fiber, fine chemistry, electric/electronic, automobile and metal industries.

Among polymers for surface coating agents, the material with improved hydrophobicity has been known very useful in the senses that it can impart on various substances properties such as water-repellent, oil-repellent, soil-release, lubricating, non-adhesion and low surface tension. Such polymer material with improved hydrobicity can be prepared using fluorine-containing monomer with perfluoroalkyl groups. The perfluoro group $[CF_3(CF_2)_n(CH_2)_2-]$ contained in the fluorine-containing monomer exhibits super-hydrophobicity with 8 dynes/cm of critical surface tension, showing the lowest surface energy among the existing compounds. The perfluoroalkyl groups are oriented toward air at the interface of air, and the surface of the coated materials shows an extremely low surface energy.

According to the conventional process to prepare materials for surface coatings, perfluoro alkyl group-containing acrylate or methacrylate and hydrocarbon-typed acrylate with ethylene oxide (EO) adduct are subject to emulsion polymerization or radical copolymerization and then emulsified in water. Although the process shows competitiveness with respect to the simplicity and performance, it is not advantageous in that it may not produce collective surface properties due to irregular polymer configuration, thus requiring an additional emulsifier depending on the use of high-cost perfluoroalkyl acrylate (hereinafter referred to as FA). The surfactant used as an additional emulsifier elevates the surface energy at coating surface, and also forms a thin layer with nano-scaled thickness on the surface of fluoro-containing polymer. In this regard, it is difficult to perform the biological/chemical transformation using functional groups at surface, and the reaction yield is decreased and the surfactant present at surface acts as a contaminant at the time of assembly and processing by use of fluorine-containing polymer, so that the additional steps become necessary.

SUMMARY OF THE INVENTION

The present inventors have conducted intensive researches to develop a novel polymer for surface coating which can exhibit excellent soil release, water-repellent and oil-repellent properties by surface modification, and allowing self-emulsification thus not necessitating an additional emulsifier. As a result, the present inventors have discovered that a fluorine-containing amphoteric polymer, prepared in such a manner that a hydrocarbon compound with hydrophilic groups serves as a main chain and a macromonomer prepared by copolymerization of an unsaturated hydrocarbon compound and a perfluoro alkyl compound is incorporated into side chains through radical polymerization, shows excellent soil release, water-repellent and oil-repellent properties by surface modification, and allows self-emulsification.

Accordingly, it is an object of this invention to provide a fluorine-containing amphoteric polymer for surface coating, which allows self-emulsification due to its amphoteric property, i.e., both super-hydrophilicity and super-hydrophobicity, and exhibits excellent soil release, water-repellent and oil-repellent properties without using an additional emulsifier.

DETAILED DESCRIPTION OF THIS INVETNION

Figure 1:
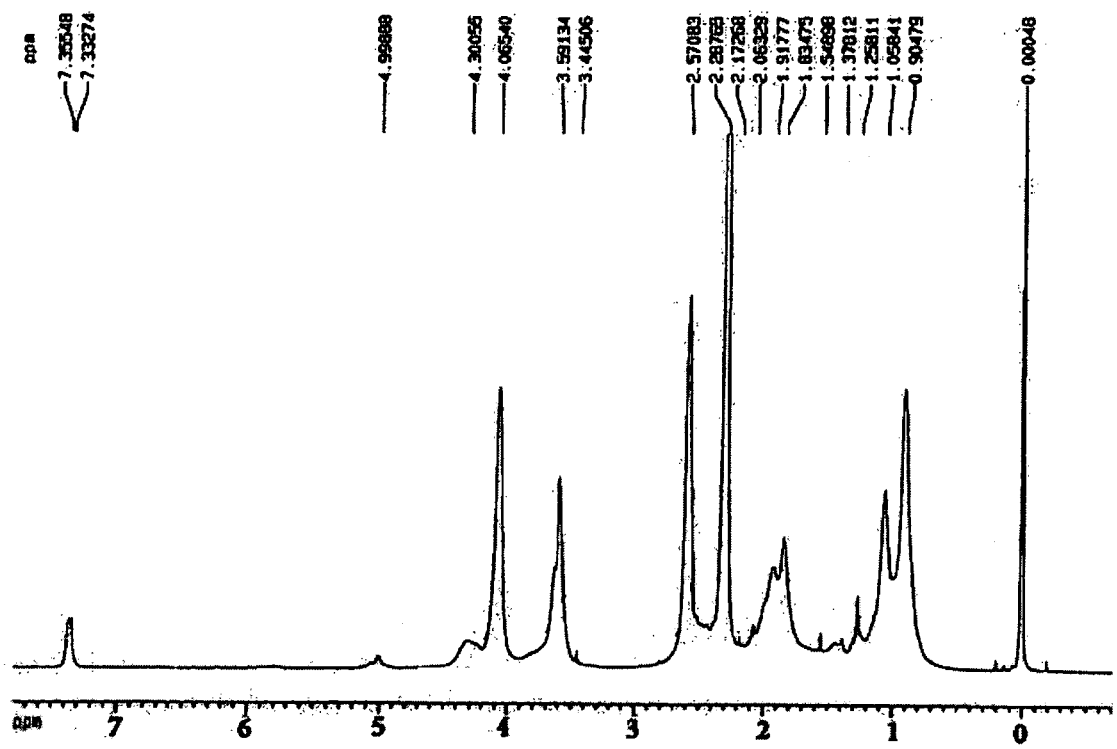
FIG. 1 shows $^1$H-NMR results of nuclear magnetic resonance (NMR) of the fluorine-containing amphoteric polymer prepared in Example 1 according to the present invention.

In one aspect of the present invention, there is provided a fluorine-containing amphoteric polymer prepared by radical copolymerization between a hydrocarbon compound with a hydrophilic group represented by formula 1 as a main chain and a macromonomer as a side chain prepared by copolymerization between an unsaturated hydrocarbon compound and a perfluoro alkyl compound selected from the group consisting of compounds represented by formulae 2a–2d:

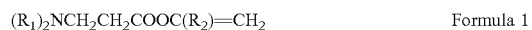   Formula 1

$(R_1)_2NCH_2CH_2COOC(R_2)=CH_2$   Formula 1

   Formula 2a $XC_nF_{2n}CH_2OCOCR_1=CH_2$   Formula 2a

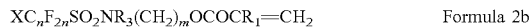   Formula 2b $XC_nF_{2n}SO_2NR_3(CH_2)_mOCOCR_1=CH_2$   Formula 2b

   Formula 2c $XC_nF_{2n}CH_2CH(OH)(CH_2)_mOCOCR_1=CH_2$   Formula 2c

   Formula 2d $XC_nF_{2n}(CH_2)_mOCOCR_1=CH_2$   Formula 2d wherein R1 and R2 are H or $CH_3$, $R_3$ is a $C_1$–$C_4$ alkyl group, X is H, F or Cl, m is an integer of 2–6 and n is an integer of 3–21.

The present invention will be described in more detail as follows:

The present invention is directed to a fluorine-containing polymer with amphoteric property, i.e., both super-hydrophilicity and super-hydrophobicity in one molecular structure in which the hydrocarbon compound with a hydrophilic group represented by formula 1 serves as a main chain and a macromonomer prepared by copolymerization of an unsaturated hydrocarbon compound and a perfluoro alkyl compound selected from the group consisting of compounds represented by formulae 2a–2d is incorporated into side chains. Since the present polymer for surface coating exhibits amphoteric property of both super-hydrophilicity and super-hydrophobicity, it allows self-emulsification and exhibits contaminant-resistant, water-repellent and oil-repellent properties.

The striking feature of the present invention lies in the fluorine-containing amphoteric polymer having collective polymer configuration with amphoteric property of both super-hydrophilicity and super-hydrophobicity in one molecule. The conventional irregular polymer exhibits soil release using a large amount of high-cost compounds containing a perfluoroalkyl group with super-hydrophobicity. However, it exhibits prominent disadvantage in view of washing. Since the present polymer has amphoteric property to allow self-emulsification, it exhibits contaminant-resistant, water-repellent and oil-repellent properties and is easily washed off.

For super-hydrophilicity of fluorine-containing amphoteric polymer, the hydrocarbon compound with hydrophilic groups represented by formula 1 is used as a main chain. The hydrocarbon compound with a hydrophilic group is at least one compound selected from the group consisting of a compound with a carboxylic group, ethylene oxide adduct, amide of carbonic acid, polymerizable sulfonic acid or its amide, diacetone acrylamide and polymerizable phosphoric acid derivative.

In addition, for super-hydrophobicity, a macromonomer, prepared by copolymerization between an unsaturated hydrocarbon compound and a perfluoroalkyl compound selected from the group consisting of compounds represented by formulae 2a–2d, is incorporated into side chains. As a result, the polymer with amphoteric property is generated. Since the perfluoroalkyl compound is oriented toward surface, the modified surface property with improved low energy is exhibited. It is preferred that the perfluoroalkyl compound is selected from the group consisting of (1) $XC_nF_{2n}CH_2OCOCR_1=CH_2$, (2) $XC_nF_{2n}SO_2NR_3(CH_2)_mOCOCR_1=CH_2$, (3) $XC_nF_{2n}CH_2CH(OH)(CH_2)_mOCOCR_1=CH_2$, (4) $XC_nF_{2n}(CH_2)_mOCOCR_1=CH_2$.

The perfluoroalkyl compound and unsaturated hydrocarbon compound for preparing macromonomers may be prepared by the conventional polymerization. According to the present invention, the unsaturated hydrocarbon compound includes (meth)acrylic acid, methyl(meth)acrylate, ethyl (meth)acrylate, butyl(meth)acrylate, hexyl(meth)acrylate, dodecyl (meth)acrylate, stearyl(meth)acrylate, benzyl(meth) acrylate, cyclohexyl(meth)acrylate, stylene, N-methylol (meth)acrylaminde, N-methylolacrylamidebutylether and 2-hydroxypropyl(meth)acrylate, but not limited to. It is preferred that the perfluoroalkyl compound and unsaturated hydrocarbon compound are used at the ratio of 95/5–5/95 wt %. If the amount of unsaturated hydrocarbon is less than the above range, the dissolution becomes poor; while if the amount exceeds the above range, the surface properties become worse. The polymerization process for obtaining macromonomers by use of two compounds may be performed according to the general polymerization. A radical polymerization is preferred in the present invention.

The hydrocarbon compound with a hydrophilic group and macromonomer are employed at the ratio of 5/95–95/5 wt %. Its compatibility with substrates for the surface modification proves to be quite excellent with low-energy surface modification effect. The hydrocarbon compound with a hydrophilic group represented by formula 1 and a macromonomer as a side chain prepared by copolymerization between an unsaturated hydrocarbon compound and a perfluoro alkyl compound selected from the group consisting of compounds represented by formulae 2a–2d are polymerized via radical polymerization using a conventional radical initiator. According to the present invention, the solution polymerization is preferred.

The fluorine-containing polymer with amphoteric property, i.e., both super-hydrophilicity and super-hydrophobicity, prepared according to the present invention allows self-emulsification without using an additional emulsifier, and shows excellent modified surface properties with lower energy and soil release, water-repellent and oil-repellent properties. Therefore, the fluorine-containing polymer of this invention is applied to water-/oil-repellent agent for industry and fiber, outdoor large constructs, antifouling paints, releasing agent for precision processing, coatings for external protection.

The following specific examples are intended to be illustrative of the invention and should not be construed as limiting the scope of the invention as defined by appended claims.

PREPARATION EXAMPLE 1

Preparation of Macromonomers 100 g (1 mol) of methylmethacrylate (hereinafter referred to as MMA), 300 g of perfluoroethyl acrylate ($CF_3(CF_2)_7CH_2CH_2COOCH=CH_2$, hereinafter referred to as FA), 20 g (0.11 mol) of benzylmethacrylate, 400 g of tetrahydrofuran (hereinafter referred to as THF), 4 g (0.024 mol) of 2,2'-azobisisobutyro nitrile (hereinafter referred to as AIBN) and 12.3 g (0.158 mol) of thioglycol were introduced into a 1 L autoclave equipped with a thermal controller and an agitation device and subject to nitrogen substitution for 10 min with agitation. The temperature of the reactant was elevated to 60□ to initiate polymerization, and the reaction product was sampled for gas chromatography analysis over reaction. Then, the reaction was terminated when the FA conversion rate reached 50%. The reaction was proceeded for about 6 hr. The product was introduced into hexane, thereby depositing fluoroalcohol with hydoxyl group at one of its terminals (hereinafter referred to as FOH).

The yield of FOH deposited was about 40% and its weight average molecular weight from gel chromatography was 3760.

50 g (0.0133 mol) of FOH and 50 g of THF were charged to the reactor and dissolved completely, and then 3.6 g (0.0399 mol) of acryloyl chloride were added over 30 min at room temperature, followed by agitation for about 24 hr to perform acylation. 4.04 g (0.0399 mol) of triethyl amine were added to the reaction mixture for neutralizing hydrochloric acid produced and hydrochloric acid-triethylamine salt was isolated by centrifugation. The isolated solution was added to hexane to deposit macromonomers and dried under at room temperature.

The yield of macromonomer was about 30% based on FOH. The macromonomer thus yielded was dissolved $CDCl_3$ and subject to nuclear magnetic resonance analysis. As a result, the peak corresponding to methyl proton of MMA was observed at about 3.6 ppm, the peak of a perfluoro alkyl group at about 4.3 ppm and 3 complex peaks of double bond at about 5.8–6.5 ppm. The degree of polymerization (PDI) was elucidated as 30.

PREPARATION EXAMPLES 2–4

The macromonomers were prepared using the ingredients and amounts indicated in Table 1 according to the procedures of PREPARATION EXAMPLE 1.

TABLE 1

| Category | Perfluoroalkyl-containing compound (g) | Unsaturated hydrocarbons (g) | Molecular weight |
|---|---|---|---|
| Prep. Ex. 2 | 320 | 80 | 6,000 |
| Prep. Ex. 3 | 280 | 120 | 4,500 |
| Prep. Ex. 4 | 240 | 160 | 3,820 |

EXAMPLE 1

Preparation of Fluorine-Containing Amphoteric Polymer 10 g of the macromonomer obtained (molecular weight 500), 10 g of 2-dimethylamino ethylmethacrylae ($(CH_3)_2NCH_2CH_2COOC(CH_3)=CH_2$, hereinafter referred to as 2-DMAEMA), 30 g of THF and 0.2 g of AIBN were introduced into a 100 ml reactor and subject to nitrogen substitution for about 10 min. The temperature of the reactant was elevated to 60□ to initiate reaction and then the reaction was proceeded for about 3 days, thereby yielding fluorine-containing amphoteric polymer.

The fluorine-containing amphoteric polymer thus obtained had collective polymer configuration and isolated by column chromatography, followed by drying under vacuum.

Figure 2:
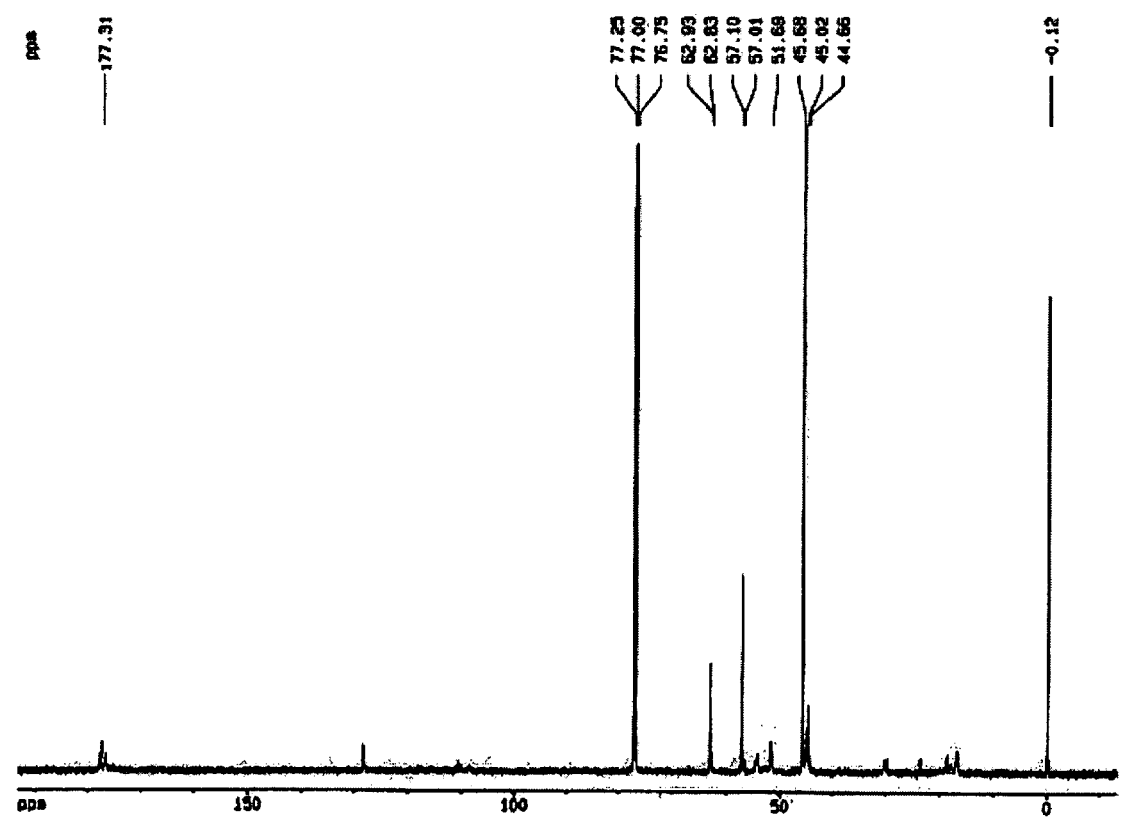
FIG. 2 shows $^{13}$C-NMR results of nuclear magnetic resonance (NMR) of the fluorine-containing amphoteric polymer prepared in Example 1 according to the present invention.

The fluorine-containing amphoteric polymer having collective polymer configuration was dissolved CDCl$_3$ and subject to nuclear magnetic resonance (NMR) analysis whose results are found in $^1$H-NMR of FIG. 1 and $^{13}$C-NMR of FIG. 2.

The peak corresponding to —CF$_2$CH$_2$ derived from FA of macromonomer was observed at 4.3 ppm and the peak of dimethylamine derived from hydrophilic comonomer 2-DMAEMA at 2.27 ppm. The weight ratio between FA and 2-DMAEMA calculated from area ratio was elucidated as about 42/58.

In addition, the fluorine-containing amphoteric polymer having collective polymer configuration was mixed with chloroform solution to 0.01 and 0.1 wt % with respect to polymethylmethacrylate (PMMA) and processed to generate a film through solvent casting. The advancing contact angle was measured by use of water and CH$_2$I$_2$, indicated in Table 3.

EXAMPLES 2–4

The fluorine-containing amphoteric polymers were prepared using the macromonomers indicated in Table 1 according to the procedure of Example 1.

Furthermore, the fluorine-containing amphoteric polymer having collective polymer configuration was mixed with chloroform to 0.01 and 0.1 wt % with respect to PMMA and processed to generate a film via solvent casting. The advancing contact angle was measured by use of water and CH$_2$I$_2$, indicated in Table 3.

TABLE 2

| Category | Macromonomer (g) | Hydrocarbons with hydrophilic groups (g) |
|---|---|---|
| Ex. 2 | Prep. Ex. 2 (10) | (10) |
| Ex. 3 | Prep. Ex. 3 (10) | (10) |
| Ex. 4 | Prep. Ex. 4 (10) | (10) |

COMPARATIVE EXAMPLE 10 g of FA, 10 g of 2-DMAEMA, 30 g of THF and 0.2 g of AIBN were introduced into a 100 ml glass reactor and subject to nitrogen substitution for 10 min. The temperature of the reactant was elevated to 60□ to initiate polymerization and then the polymerization was continued for about 28 hr, thereby yielding irregular copolymer.

The irregular copolymer thus obtained was isolated by column chromatography and dried under vacuum. The final product was dissolved in CDCl$_3$ and analyzed with nuclear magnetic resonance (NMR), showing the weight ratio of FA/2-DMAEMA of 41/59.

The irregular copolymer was mixed with chloroform to 0.01 and 0.1 wt % with respect to PMMA and processed to generate a film through solvent casting. The advancing contact angle was measured by use of water and CH$_2$I$_2$, indicated in Table 3.

TABLE 3

| category | Content of copolymer in PMMA (wt %) | water (deg.) | CH$_2$I$_2$ (deg.) | Surface energy (dyn/cm) |
|---|---|---|---|---|
| Ex. 1 | 0.01 | 93.1 | 64.7 | 26.55 |
|  | 0.1 | 106.3 | 88.2 | 14.15 |
| Ex. 2 | 0.01 | 94.0 | 67.0 | 25.29 |
|  | 0.1 | 107.3 | 89.0 | 13.71 |
| Ex. 3 | 0.01 | 92.0 | 63.0 | 27.57 |
|  | 0.1 | 104.3 | 85.0 | 15.67 |
| Ex. 4 | 0.01 | 91.0 | 60.0 | 29.21 |
|  | 0.1 | 101.0 | 80.0 | 18.23 |
| Com. Ex. | 0.01 | 74.6 | 46.0 | 39.71 |
|  | 0.1 | 91.8 | 62.9 | 27.65 |

As shown in Table 3, the advancing contact angles of Examples 1–4 to demonstrate water-repellent and oil-repellent properties are much higher than those of Comparative Example, even though an equal amount of perfluoroalkyl group-containing compounds were used.

As discussed previously, the present invention is directed to a fluorine-containing polymer having collective polymer configuration with amphoteric property, i.e., both super-hydrophilicity and super-hydrophobicity. The present polymer shows excellent modified surface properties compared to the conventional irregular polymers, allows self-emulsification without using an additional emulsifier, and shows soil release, water-repellent and oil-repellent properties. Therefore, the fluorine-containing polymer of this invention can be applied to water-/oil-repellent agent for industry and fiber, outdoor large constructs, contaminant-resistant paints, releasing agent for precision processing, coatings for external protection and biological/biochemical fields.

What is claimed is:

1. A self-emulsifying fluorine-containing amphoteric polymer prepared by radical copolymerization between a hydrocarbon compound with a hydrophilic group represented by formula 1 as a main chain and a macromonomer as a side chain prepared by copolymerization between an unsaturated hydrocarbon compound and a perfluoro alkyl compound selected from the group consisting of compounds represented by formulae 2a–2d:

$(R_1)_2NCH_2CH_2COOC(R_2)=CH_2$ Formula 1
$XC_nF_{2n}CH_2\text{-}OCOCR_1=CH_2$ Formula 2a
$XC_nF_{2n}SO_2NR_3(CH_2)_mOCOCR_1=CH_2$ Formula 2b
$XC_nF_{2n}CH_2CH(OH)(CH_2)_mOCOCR_1=CH_2$ Formula 2c
$XC_nF_{2n}(CH_2)_mOCOCR_1=CH_2$ Formula 2d wherein $R_1$ and $R_2$ are H or $CH_3$, $R_3$ is a $C_1$–$C_4$ alkyl group, X is H, F or Cl, m is an integer of 2–6 and n is an integer of 3–21.

2. The self-emulsifying fluorine-containing amphoteric polymer according to claim 1, wherein said hydrocarbon compound with a hydrophilic group and said macromonomer are subject to radical copolymerization at the ratio of 5/95–95/5 wt %.

3. The self-emulsifying fluorine-containing amphoteric polymer according to claim 1, wherein said hydrocarbon compound with a hydrophilic group further comprises at least one compound selected from the group consisting of a compound with a carboxylic group, ethylene oxide adduct, amide of carbonic acid, polymerizable sulfonic acid or its amide and diacetone acrylamide.

4. The self-emulsifying fluorine-containing amphoteric polymer according to claim 1, wherein said unsaturated hydrocarbon compound is at least one selected from the group consisting of (meth)acrylic acid, methyl(meth)acrylate, ethyl(meth)acrylate, butyl(meth)acrylate, hexyl(meth)acrylate, dodecyl (meth)acrylate, stearyl(meth)acrylate, benzyl(meth)acrylate, cyclohexyl(meth)acrylate, styrene, N-methylol (meth)acrylaminde, N-methylolacryl amidebutylether and 2-hydroxypropyl(meth)acrylate.

5. A process for preparing the fluorine-containing amphoteric polymer of claim 1, which comprises the steps of: preparation of a macromonomer by copolymerizing an unsaturated hydrocarbon compound and a perfluoro alkyl compound selected from the group consisting of compounds represented by formulae 2a–2d at the ratio of 5/95–95/5 wt %; and radical copolymerization of a hydrocarbon compound with a hydrophilic group represented by formula 1 and said macromonomer at the ratio of 5/95–95/5 wt %, so that said macromonomer as a side chain is incorporated into said hydrocarbon compound as a main chain:

$(R_1)_2NCH_2CH_2COOC(R_2)CH_2$ Formula 1
$XC_nF_{2n}CH_2OCOCR_1=CH_2$ Formula 2a
$XC_nF_{2n}SO_2NR_3(CH_2)_mOCOCR_1=CH_2$ Formula 2b
$XC_nF_{2n}CH_2CH(OH)(CH_2)_mOCOCR_1=CH_2$ Formula 2c
$XC_nF_{2n}(CH_2)_mOCOCR_1=CH_2$ Formula 2d wherein $R_1$ and $R_2$ are H or $CH_3$, $R_3$ is a $C_1$–$C_4$ alkyl group, X is H, F or Cl, m is an integer of 2–6 and n is an integer of 3–21.

* * * * *